United States Patent Office 3,535,886
Patented Oct. 27, 1970

3,535,886
PRODUCTION OF HIGH PURITY NITROGEN FROM AIR BY DISTILLATION WITH DEPRESSURIZED, WORK EXPANDED AND COOLED OXYGEN-RICH BOTTOMS USED IN INDIRECT HEAT EXCHANGE FOR THE DISTILLATION
Michael L. Hoffman, Beverly Hills, Calif., assignor, by mesne assignments, to McDonnell Douglas Corporation, Santa Monica, Calif., a corporation of Maryland
Filed July 5, 1967, Ser. No. 651,309
Int. Cl. F25j 3/04
U.S. Cl. 62—13                11 Claims

ABSTRACT OF THE DISCLOSURE

Producing gaseous and liquid nitrogen from air by moderately compressing air, e.g., to about 8 atmospheres, cooling the compressed air approximately to saturation, passing the compressed saturated air into a separation zone, withdrawing high purity gaseous and/or liquid nitrogen from the upper end of such zone, withdrawing an oxygen-rich liquid mixture from a lower end of said zone, throttling such liquid mixture to an intermediate pressure e.g., of the order of about 5 atmospheres at reduced temperature, passing the throttled mixture into heat exchange relation preferably along said separation zone to provide condensing duty for such zone, heating the exiting oxygen-rich mixture and expanding same to a reduced pressure, e.g., of the order of about 1.5 atmospheres, and passing the expanded mixture into heat exchange relation preferably along the separation zone to provide additional condensing duty therefor, the exiting streams of nitrogen product and oxygen-rich mixture being passed in heat exchange relation with the compressed air feed for cooling same to saturation, thus providing a process and system for separating from air substantially pure nitrogen product at high pressure approximating the feed air pressure at high efficiency.

---

Figure 1:
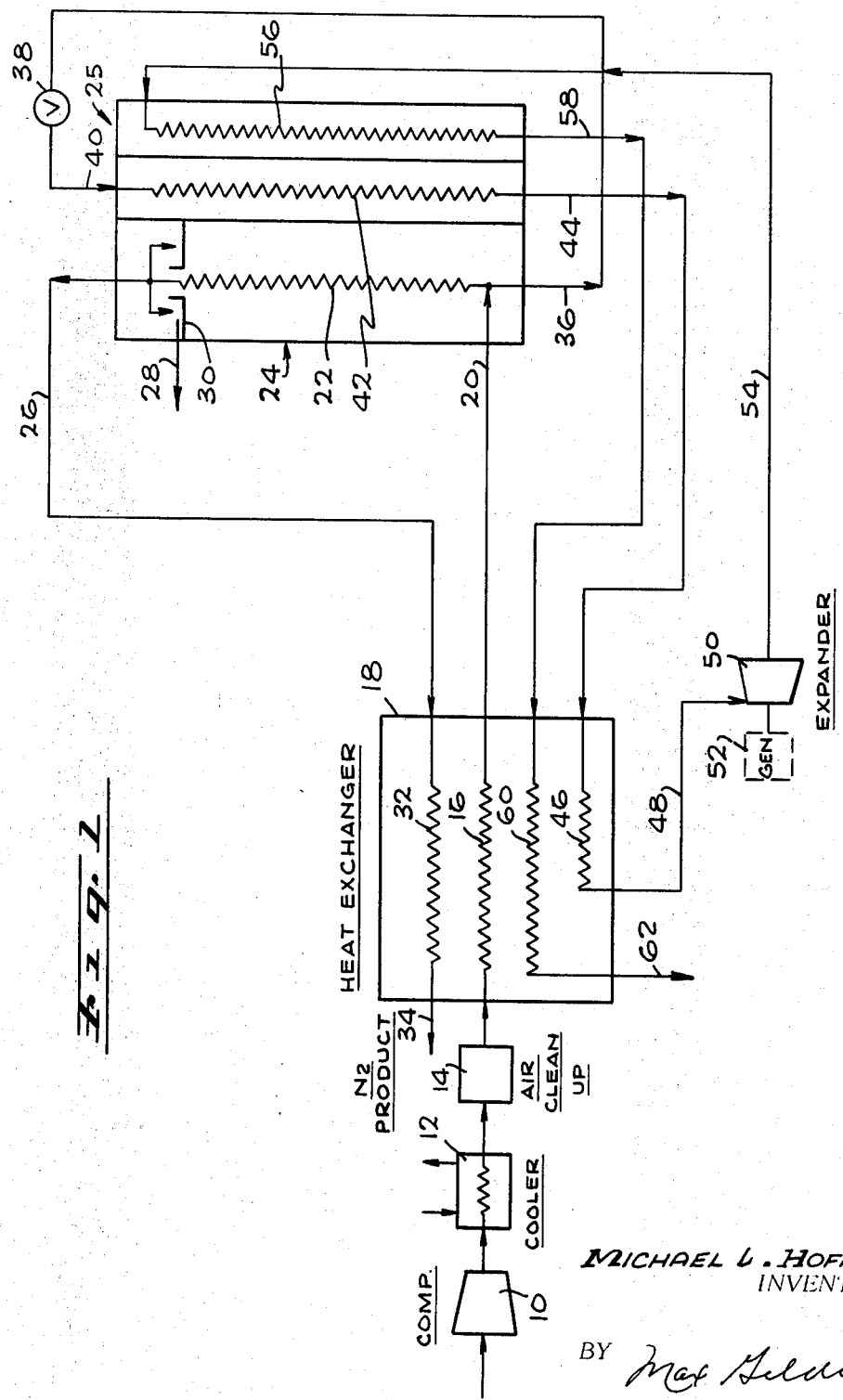

This invention relates to the separation and production of nitrogen from air by low temperature rectification, and is particularly concerned with procedure for the production of nitrogen from air, employing a single separation zone, and suitably recycling a portion of the effluent from the separation zone under conditions to provide adequate condensing duty for the separation zone, preferably employing in the separation zone the principle of non-adiabatic "differential" distillation, so as to provide nitrogen product in either gaseous or liquid form, or both, and of any desired purity, at high pressure approximately at or somewhat less than the pressure of the air feed.

Briefly, the invention procedure comprises compressing an air feed, cooling the compressed air approximately to its saturation temperature, introducing the cool condensed air into a separation zone, effecting a separation of such air feed in said zone, withdrawing nitrogen from the upper end of such separation zone at substantially the pressure of the compressed air feed, withdrawing an oxygen-rich liquid air mixture from the lower end of the separation zone, reducing the pressure and temperature of such liquid mixture, passing such mixture in heat exchange relation with the separation zone to condense reflux in the separation zone, heating the exiting oxygen-nitrogen mixture, reducing the pressure and temperature of such heated mixture, as by work expansion thereof to generate refrigeration, and passing the expanded and cooled mixture into heat exchange relation with the separation zone to provide additional condensing duty for the separation zone, and withdrawing such expanded mixture.

In prefered practice of the invention, the oxygen-rich mixture in both of the above described passes in heat exchange relation with the separation zone, is passed along such separation zone, that is, lengthwise of such zone. By reducing the temperature of the oxygen-rich withdrawn from the separation zone, and passing such mixture in two passes in heat exchange relation along the separation zone, a non-adiabatic "differential" distillation occurs in the separation zone or column so that heat is incrementally withdrawn from the column throughout the entire height of the column, and substantially pure compressed nitrogen, in either gaseous or liquid form can be withdrawn as overhead from the upper end of the column, while an oxygen-rich liquid condenses in the lower section of the column.

According to preferred practice, at least a portion of the nitrogen product withdrawn from the upper end of the separation zone and the expanded oxygen-nitrogen mixture finally withdrawn from heat exchange relation with the separation zone, are both passed in heat exchange relation with the compressed air feed for cooling same to its saturation temperature. Further, according to preferred practice, the oxygen-nitrogen mixture withdrawn from its first pass in heat exchange relation with the separation zone, is heated by passing such mixture in heat exchange relation with the compressed air feed to provide additional cooling therefor, prior to work expansion of such oxygen-nitrogen mixture.

As an additional preferred feature, following such heating of the oxygen-nitrogen mixture, such mixture is compressed and cooled prior to work expanding such mixture, that is, employing a turbine or like expander, the energy derived from such work expansion preferably being employed for compressing the mixture.

The invention provides a highly versatile process and system for production of either gaseous or liquid nitrogen, or any desired combination thereof, at high purity and at high pressure close to the pressure of compressed air feed, while operating under high efficiency employing the oxygen-nitrogen mixture withdrawn from the separation zone, suitably cooled and refrigerated, as the sole source of condensing duty for carrying out the low temperature separation, and particularly utilizing the principle of differential distillation, thus providing highly efficient and economical operation and substantially reducing the cost per ton of nitrogen product.

One of the features of operation of the invention process and system is that the oxygen-nitrogen mixture withdrawn from the separation zone is recycled in two passes in heat exchange relation along the separation zone, under conditions such that the mixture prior to its first pass along the separation zone, is at relatively high pressure yet is at a sufficiently reduced temperature to provide condensing duty to such separation zone, such relatively high pressure of the oxygen-nitrogen mixture following its first pass in heat exchange relation with the separation zone, permitting work expansion of the exiting fluid to generate refrigeration and reduce the temperature of such mixture, to permit its use in a second pass in heat exchange relation along the separation zone, to provide additional condensing duty for the separation zone.

Figure 2:
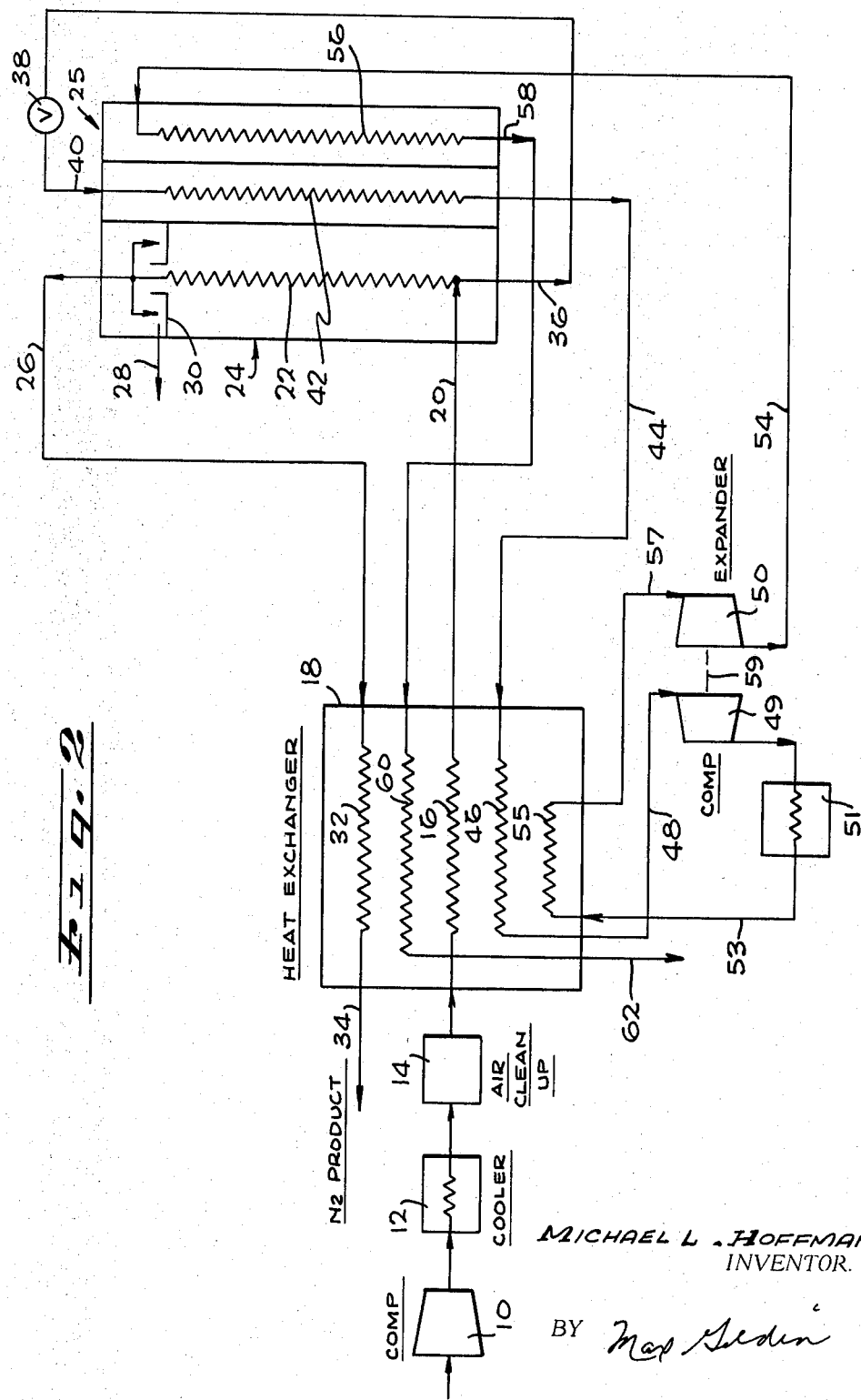

The invention will be understood more clearly by the description below of certain embodiments of the invention, taken in connection with the accompanying drawing wherein:

FIG. 1 is a schematic representation of the basic novel system of the invention, and FIG. 2 illustrates a preferred modification of the system of FIG. 1.

Referring to FIG. 1 of the drawing, illustrating the basic principles of the invention, air is compressed at 10, preferably to a pressure of between about 5 and about 10 atmospheres, e.g., 8.0 atmospheres, and which is slightly greater than the desired nitrogen pressure. The compressed air is passed through a precooler 12 cooled by water, and is then cleaned at 14 of water and carbon dioxide in any suitable well-known manner, e.g., by an absorption system or by freeze-out in reversing regenerators. The exiting air is then further cooled by passage through coil 16 of heat exchanger 18 by countercurrent heat exchange with outgoing products, as described in detail hereinafter. The compressed air thus cooled and exiting heat exchanger 18 at 20, has a temperature of about 107° K. (Kelvin) and a pressure of 7.5 atmospheres, based on an initially compressed air feed of 8 atmospheres.

The resulting compressed and saturated air feed mixture at 20 is introduced into the lower end of one or more passages indicated at 22, of a separation zone or column 24 contained in a unit 25. The saturated air feed mixture rises in the passages 22 in contact with descending liquid and thus becomes rich in nitrogen and effecting a separation therein. Either high purity nitrogen gas is withdrawn at 26 from the top of the zone or column 24, or high purity nitrogen liquid is withdrawn at 28 from a collector 30 at the top of the column, or both nitrogen gas at 26 and liquid nitrogen at 28 are withdrawn in various ratios, depending on the particular mode of operation, as described more fully below.

The nitrogen vapor and liquid nitrogen thus withdrawn at 26 and 28 respectively are at a pressure of about 7.5 atmospheres and a temperature of about 100° K. The nitrogen vapor product stream at 26 is conducted through coil 32 of the heat exchanger 18 in heat exchange relation with compressed air feed at 16 for cooling same. The vapor nitrogen product exiting the heat exchanger at 34 is at a pressure of about 7.0 atmospheres and a temperature of about 294° K.

It is thus seen that the gaseous and liquid high purity nitrogen product streams at 34 and 28 are provided at a high pressure close to the 8.0 atmospheres pressure of the feed air.

Oxygen-rich liquid air, or an oxygen-rich liquid mixture comprising essentially oxygen and nitrogen, is withdrawn at 36 from the passages 22 at the bottom of the separation zone 24, at a pressure of about 7.5 atmospheres and a temperature of about 106° K. The percentage of oxygen in the oxygen-rich liquid mixture withdrawn at 36 can range from about 22% to about 40%, depending upon whether the process is carried out in an "all gas" mode or an "all liquid" mode. When an essentially all gas mode operation is carried out, that is, where the nitrogen product obtained from the top of the separation column 24 is essentially all gas at 26, the percentage of oxygen in the oxygen-rich liquid mixture at 36 is high, e.g., of the order of about 38%, and where operating under an all-liquid mode, that is, where the nitrogen product removed from the top of the separation zone 24 is essentially all liquid at 28, the oxygen present in the liquid mixture at 36 is at the low end of the above range, e.g., of the order of about 23%. Where varying proportions of nitrogen vapor product at 26 and liquid nitrogen at 28 are produced, the percentage of oxygen will vary within the above-noted range.

The oxygen-rich liquid air mixture withdrawn at 36 is flashed by the throttling valve 38 to an intermediate pressure to produce a mixture at 40 of the order of about 5 atmospheres and a temperature of 90° K., sufficient to provide condensing duty for the separation zone 24, i.e., to condense reflux in the distillation section in the upper portions of the passages 22 of the column 24, as noted below. The resulting flashed fluid at 40 is introduced into the upper end of one or more passages indicated at 42, in unit 25. It will be noted that the passages 42 extend substantially the entire length of the separation zone 24 and the passages 22 therein, in heat exchange relation with such passages 22. Passage of the oxygen-nitrogen mixture through channels or passages 42 supplies condensing duty for provision of reflux in passages 22 of the separation zone 24, the mixture in passages 42 thus being vaporized. It will be noted that the pressure of the liquid mixture at 36 is preferably reduced sufficiently by throttling at 38 such that the temperature of the throttled mixture at 40 is sufficient to permit the mixture to be substantially completely vaporized in passages 42 by absorption of heat from separation zone 24.

The exiting oxygen-nitrogen vapor mixture at 44 passes through a coil 46 of the heat exchanger 18 for additional cooling of the air feed at 16, thus warming such vapor mixture, and the warmed exiting vapor at 48 at a temperature of between 110 and 130° K. at a pressure of about 5 atmospheres is work expanded in turbine 50 so that the vapor discharge from the turbine is reduced to a pressure of about 1.3 atmospheres and is cooled approximately to saturation, 82 to 90° K., at such pressure, thus generating refrigeration. It will be noted that the oxygen-nitrogen vapor mixture is warmed in coil 46 of the heat exchanger to a temperature such that after expansion in turbine 50, the temperature of the expanded fluid will be at or a few degrees above its saturation temperature. The energy of expansion provided by turbine 50 is either wasted or can be employed, e.g., for driving an electric generator indicated by dotted lines at 52.

The turbine discharge fluid at 54 cooled approximately to saturation as previously noted, is then fed to one or more heat exchange passages, indicated at 56, in the unit 25. As is the case of heat exchange passages 42, passages 56 also extend substantially the entire length of the separation column 24 and the vapor-liquid passages 22 therein, in heat exchange relation with passages 22. While passing downwardly through the passages 56, the fluid therein provides additional condensing duty for the distillation section in the upper portions of the passages 22 of the separation zone 24. The warmed oxygen-nitrogen fluid stream withdrawn at 58 from the lower ends of the passages 56, at a pressure of 1.3 atmospheres and about 100° K. is conducted through passages 60 of the heat exchanger 18 in heat exchange relation with compressed air feed at 16 to provide cooling therefor, and is discharged as waste at 62, at a pressure of about 1 atm. and at about 294° K.

It is seen from the above that by passage of the cooled fluid streams 40 and 54 through the respective passages 42 and 56 in heat exchange relation with the vapor-liquid containing passages 22 in the separation zone 24, along the entire length of such zone, a highly efficient non-adiabatic differential distillation is carried out in the separation zone passages 22.

The process of the invention described above has as an important feature the maintenance of as high a pressure as possible of the fluid at 40 while the temperature thereof is reduced sufficiently to supply condensing duty at 42 to the separation zones 22. By maintaining a high pressure at 42, this permits expansion of the exiting fluid at 44 through the turbine 50 to generate sufficient refrigeration and to provide a discharge fluid at 54 of sufficiently low temperature to provide additional condensing duty at 56 for the vapor-gas liquid mixture being separated in passages 22 of the separation zone 24. The use of non-adiabatic differential distillation as opposed to conventional adiabatic distillation permits the temperature of the throttled liquid at 40 to be higher and thus the pressure of the mixture at 40 and 48 is correspondingly higher, resulting in a greater amount of refrigeration generated across the expander 50.

In the process of the present invention, the above-noted refrigeration generating feature in conjunction with recycled oxygen-nitrogen mixture to provide condensing duty avoids the necessity in many prior art processes of providing additional refrigeration by expansion and recycling of nitrogen product, and also avoids introduction of additional feed air for expansion and use thereof for refrigeration.

Variations in gas to liquid ratio of nitrogen product at 26 to 28 are accomplished in the following manner. When operating essentially in an all gas mode or at high gas to liquid ratio, relatively high oxygen concentration is maintained in the oxygen-rich liquid air at 36. This maintains the flow of fluid at 36 low and the flow of nitrogen vapor product at 26 correspondingly high. Since the fluid at 36 under these conditions has a high oxygen concentration, the pressure of the fluid at 40 must be reduced in order to condense liquid in passages 22 of the separation zone 24. Thus, the flow and pressure ratio of the turbine stream at 48 and 54 are both low, and the amount of turbine refrigeration and of refrigerated stream 54 required are relatively low for high gas to liquid product ratio.

On the other hand, when operating in an essentially all liquid mode, or when low nitrogen gas to liquid ratio is required at 26 and 28, the oxygen concentration of the oxygen-rich liquid air at 36 is relatively low, e.g., as low as about 23%, slightly more than the oxygen content of the air feed, and hence less nitrogen vapor product will be withdrawn at 26, with the flow of liquid nitrogen product at 28 correspondingly higher. Since the fluid at 36 is relatively low in oxygen concentration, the boiling temperature of such fluid will be lower for any given pressure. Thus, the pressure of the fluid at 40 under these conditions can be relatively higher than in the above described situation for high gas to liquid ratio. Both the flow and pressure ratio of the turbine streams 48 and 54 will accordingly be higher, and thus the turbine can provide adequate refrigeration at 56 for the relatively high liquid nitrogen production at 28.

For example, according to the above-described system of the invention, a plant having a capacity producing twenty tons per day of gaseous nitrogen when operating in an "all gas" mode, would produce three tons per day of liquid when operating in an all liquid mode, both modes of operation using approximately the same air feed pressure and flow rate.

FIG. 2 of the drawing illustrates a modification of the process and system described above and illustrated in FIG. 1, and represents preferred practice of the invention for obtaining greatest efficiency of operation. Referring to FIG. 2, the same numerals are employed corresponding to the same elements of FIG. 1. The difference in the process and system of FIG. 2 over that of FIG. 1, resides in that the oxygen-nitrogen vapor mixture at 48, at the intermediate pressure of about 5 atmospheres, is heated to a temperature of about 294° K., and is further compressed in compressor 49, is then cooled by passage through cooler 51, and the exiting stream 53 at a pressure of about 7 atmospheres and a temperature of about 300° K., is cooled by recycling through coil 55 of the heat exchanger 18 to a temperature of about 110 to about 130° K. The compressed cooled vapor stream 57 exiting the heat exchanger 18, is fed to the turbine 50 and the expanded stream 54 from the turbine, reduced in pressure to about 1.3 atmospheres and at or slightly above saturation temperature is then fed through the heat exchange passages 56 to provide additional condensing duty for the separation zone as described above. The turbine 50 is coupled at 59 to the compressor 49 so that the energy of expansion from the turbine 50 is utilized to drive the compressor 49.

It will be seen from the description of the invention above, that the process and system of the invention permits variation in pressure ratios through the expansion turbine 50, and thus permitting variation and versatility with respect to operation of the process and system for producing an essentially all-gas nitrogen product, an essentially all-liquid nitrogen product, or any desired proportions thereof.

Accordingly, for all-liquid operation, the invention system permits high pressure ratios across the turbine in conjunction with high fluid rates, and for all gas operation, permits low pressure ratios across the turbine in conjunction with low fluid rates. The high pressure ratio-high flow, low pressure ratio-low flow character of the invention system are particularly well adapted to the characteristic requirements of conventional turbo-expanders.

The heat exchange passages or construction 42 and 56 for the recycled oxygen-rich vapor at 40 and 54, and the associated passages 22 of the separation zone or column 24, all contained within the unit 25, can be in the form of a unitary plate-fin heat exchanger (not shown) wherein the passages or channels 42 and 56 for the oxygen-nitrogen heat exchange fluid, are arranged in indirect heat exchange relation with the passages or channels 22 bearing the liquid-vapor air mixture being separated in the separation zone 24. Thus, the channels or passages 22 in the separation zone or column 24 can be constructed in the manner of a series of perforated fins, or plates, producing the effect of distillation column trays. This is a known type of heat exchanger arrangement described in International Advances in Cryogenics, vol. 10, 1965. A heat exchanger arrangement or construction of this type is also disclosed in the co-pending application Ser. No. 572,135, filed Aug. 12, 1966, of James D. Yearout, and which is incorporated herein by reference. Since such heat exchanger arrangements or constructions per se form no part of the present invention, they are not shown herein. Altrough such a plate-fin type of heat exchanger arrangement is preferably employed, any other suitable form of heat exchanger apparatus can be employed in providing the unit 25 containing the separation zone 24 in indirect heat exchange relation with the passages 42 and 56 for the oxygen-nitrogen heat exchange fluid for condensing duty as described above and shown in FIGS. 1 and 2, so as to effect the above-described differential distillation in the separation zone or column 24.

It will be understood that the systems described above, including the temperatures and pressures set forth, are only illustrative and are not intended as limitative of the invention.

Although in preferred practice, for obtaining highest efficiency the heat exchange passages 42 and 56 are disposed lengthwise in heat exchange relation with the separation zone or column 24, as shown in FIGS. 1 and 2, to effect a non-adiabatic differential distillation, the process and system of the invention can be applied to conventional adiabatic distillation. In the latter case, for example, the heat exchange passages corresponding to 42 and 56 can be disposed transversely across the upper end portion of the separation zone or column 24, and the cooled oxygen-nitrogen vapor mixture at 40 and 54 can be passed through such transverse passages or channels, to provide condensing duty in the upper portion of zone 24 for the vapor-liquid mixture being separated therein. However, this type of operation is not preferred.

From the foregoing, it is seen that the invention provides a novel method and system for producing high purity nitrogen product, either in liquid or in gaseous form, at high pressure close to the pressure of the feed air, preferably employing a highly efficient rectification system, involving use of non-adiabatic differential distillation, and using only recycled waste product at suitable temperatures and pressures for providing condensing duty to maintain reflux in the separation zone.

While I have described particular embodiments of my invention for the purpose of illustration, it should be understood that various additional modification and adaptations thereof may be made within the spirit of the invention, and within the scope of the appended claims.

I claim:

1. A process for the separation of nitrogen from air for production of nitrogen product in gaseous or liquid form, of high purity, which comprises compressing an air feed, cooling said compressed air approximately to its saturation temperature, introducing said cooled compressed air into a single separation zone, effecting a distillation of said air feed in said zone, withdrawing high purity nitrogen from the upper end of said separation zone at substantially the pressure of said compressed air feed, withdrawing an oxygen-rich liquid air mixture from the lower end of said separation zone, reducing the pressure and temperature of said liquid mixture, passing said last-mentioned mixture at said reduced pressure in indirect countercurrent heat exchange relation with vapor flow in said separation zone, along the entire length of said separation zone, to condense reflux in said separation zone, heating the oxygen-rich mixture exiting from heat exchange relation with said separation zone, reducing the pressure and temperature of said heated mixture by work expansion thereof, and passing said expanded and cooled mixture at said last mentioned reduced pressure into indirect countercurrent heat exchange relation with vapor flow in said separation zone, along the entire length of said zone, to provide additional condensing duty for said separation zone, and withdrawing said expanded mixture.

2. A process as defined in claim 1, including said step following said heating the exiting oxygen-rich mixture, of compressing said mixture and cooling same prior to said work expansion of said mixture, the energy derived from said work expansion being employed for said compressing said mixture.

3. A process as defined in claim 1, wherein said oxygen-rich mixture withdrawn from the lower end of said separation zone is throttled to a reduced temperature sufficient to provide condensing duty for said separation zone, and to a reduced pressure sufficiently high to permit said subsequent work expansion of said heated oxygen-nitrogen mixture so as to generate refrigeration and provide said expanded and cooled mixture at a sufficiently low temperature to provide said additional condensing duty for said separation zone.

4. A process as defined in claim 1, wherein said nitrogen product withdrawn from said separation zone is produced at high gas to liquid ratio, and wherein said oxygen-rich liquid withdrawn from said separation zone has a high oxygen content, and the flow rate of said oxygen-rich fluid stream passed in heat exchange relation with said separation zone and the pressure ratio of said work expansion of said flow stream are low.

5. A prcess as defined in claim 1, wherein said nitrogen product withdrawn from said separation zone is produced at high liquid to gas ratio, and wherein said oxygen-rich liquid withdrawn from said separation zone has a low oxygen content, and the flow rate of said oxygen-rich fluid stream passed in heat exchange relation with said separation zone and the pressure ratio of said work expansion of said flow stream are high.

6. A process as defined in claim 1, wherein said air feed is compressed to about 5 to about 10 atmospheres pressure, and said nitrogen product is provided at a slightly lower pressure than said air feed.

7. A process as defined in claim 1, wherein (1) gaseous nitrogen product withdrawn from the upper end of said separation zone, (2) said exiting oxygen-rich mixture prior to expansion thereof, and (3) said expanded oxygen-nitrogen mixture finally withdrawn from said separation zone, are all passed in heat exchange relation with said compressed air feed for cooling same to its saturation temperature.

8. A system for the separation of nitrogen from air for production of nitrogen product in gaseous or liquid form, of high purity, which comprises means for compressing an air feed, means for cooling said compressed air approximately to its saturation temperature, a distillation column, means for introducing said cooled compressed air into the lower end of said column and effecting a separation of said air feed in said column, means for withdrawing high purity nitrogen from the upper end of said column, means for withdrawing an oxygen-rich liquid air mixture from the lower end of said column, means for reducing the pressure and temperature of said withdrawn liquid mixture, means for passing said last-mentioned mixture at said reduced pressure downwardly in indirect countercurrent heat exchange relation with vapor flow in said column, along the entire length of said column, to condense reflux in said column, means for heating the oxygen-rich mixture exiting from heat exchange relation with said column, an expander, means for introducing said heated mixture into said expander, said expansion of said mixture generating refrigeration, means for passing said expanded and cooled mixture downwardly into indirect countercurrent heat exchange relation with vapor flow in said column, along the entire length of said column, to provide additional condensing duty for said column, and means for withdrawing said expanded mixture from said column.

9. A system as defined in claim 8, said means for passing said oxygen-rich mixture withdrawn from said column, and said expanded and cooled oxygen-nitrogen mixture, both into heat exchange relation with said column, comprising means forming passages lengthwise along the entire length of said column and in heat exchange relation therewith, to effect a non-adiabatic distillation in said column.

10. A system as defined in claim 9, including means for compressing said heated exiting oxygen-rich mixture and means for cooling said compressed mixture prior to introducing said mixture into said expander, said expander being connected to said compressing means for driving same.

11. A system as defined in claim 8, said means for cooling said compressed air feed including a heat exchanger, means for passing said compressed air feed through said heat exchanger, means for conducting gaseous nitrogen product withdrawn from the upper end of said column, through said heat exchanger in heat exchange relation with said compressed air feed, means for conducting said exiting oxygen-rich mixture prior to expansion thereof through said heat exchanger in heat exchange relation with said compressed air feed and effecting said heating of said mixture, and means for conducting said expanded mixture finally withdrawn from said column through said heat exchanger in heat exchange relation with said compressed air feed.

References Cited
UNITED STATES PATENTS

| | | | |
|---|---|---|---|
| Re. 23,463 | 2/1952 | Jenny et al. | 62—29 |
| 1,800,353 | 4/1931 | Messer | 62—31 |
| 2,122,238 | 6/1938 | Pollitzer | 62—31 |
| 2,713,781 | 7/1955 | Williams | 203—100 |
| 2,753,698 | 7/1956 | Jakob | 62—31 |
| 2,760,351 | 8/1956 | Schilling | 62—31 |
| 2,964,913 | 12/1960 | Smith | 62—38 |
| 3,217,502 | 11/1965 | Keith | 62—31 |
| 3,264,831 | 8/1966 | Jakob | 62—29 |
| 3,358,460 | 12/1967 | Smith et al. | 62—38 |

WILBUR L. BASCOMB, Jr., Primary Examiner

U.S. Cl. X.R.

62—30, 31, 39; 202—158